INVENTOR.
RICHARD K. MATUSCHKOVITZ

ATTORNEYS

INVENTOR.
RICHARD K. MATUSCHKOVITZ
ATTORNEYS

Nov. 17, 1964 R. K. MATUSCHKOVITZ 3,157,492
INJECTION OF SOLID MATERIAL INTO MOLTEN METAL
Filed April 11, 1963 4 Sheets-Sheet 4

INVENTOR.
RICHARD K. MATUSCHKOVITZ

BY

ATTORNEYS

United States Patent Office 3,157,492
Patented Nov. 17, 1964

3,157,492
INJECTION OF SOLID MATERIAL INTO
MOLTEN METAL
Richard K. Matuschkovitz, Chicago, Ill., assignor to
Chemetron Corporation, Chicago, Ill., a corporation of
Delaware
Filed Apr. 11, 1963, Ser. No. 272,395
9 Claims. (Cl. 75—51)

This invention relates to a method and system for injection solid, particulate material into molten metal below the surface thereof, particularly for refining, purifying, alloying and generally treating said molten metal. More particularly, this invention relates to the method of refining iron by injecting intermittently solid materials in a stream of gas below the surface of the molten metal in a furnace. More specifically, the invention relates to a method of desulfurizing iron by the intermittent injection of calcium carbide in a gas stream below the surface of molten iron in a cupola furnace.

Shaft furnaces, such as cupolas, have been used for the production of cast iron by melting pig iron, scrap iron and steel with fluxing materials, the heat being supplied by the combustion of coke with air blown into the cupola through tuyeres. In ordinary practice the cupola is first filled with coke to some distance above the tuyere level and this coke is ignited and burnt in. When the coke is white hot, charging begins and the melting operation is started. Layers of limestone and pig iron and scrap iron and steel are placed above the coke bed with alternative layers of coke to replace the coke which burns out during the operation. As the iron charge descends in the cupola, the metal becomes soft and finally melts in the melting zone which is the hottest zone, immediately above the tuyere level. Liquid superheated iron flows around the coke pieces in the coke bed and is collected in the well of the cupola from where it is tapped through the tap hole.

The Carter Patent No. 2,643,185 discloses that the addition of a relatively small amount of calcium carbide to the cupola charge is effective in reducing the sulfur content of the iron. The Timmerbeil et al. Patent No. 2,865,735 discloses an improvement whereby calcium carbide, the melting point of which is lower than 1800° C., is introduced into the cupola as part of the charge. These techniques have produced substantial improvements in the desulfurization of iron but they have certain inherent disadvantages, one of which is that the procedure is not effective until several charges have been passed through the cupola. Furthermore, the calcium carbide reacts with the iron in the melting zone of the cupola and part of the calcium carbide is oxidized and creates heat which increases the melting zone temperature, which results in a higher carbon pickup and higher melting rate. In addition, the contact between the molten metal (iron) and the solid material (calcium carbide) in the melting zone and above is inefficient with the result that the molten metal is not efficiently refined (desulfurized).

Although methods and systems have been devised for injecting solids beneath the surface of molten metals, such prior procedures have had substantial disadvantages. For instance, if the solids are injected by a continuous gas stream it has been found that the solids tend to accumulate in the inejection tube and eventually plug it. If the pressure of the gas is great enough to prevent plugging, the amount of gas required is substantial and if the gas contains oxygen (e.g., air) there is excessive oxidation of the molten metal. These problems have been avoided by the present invention which requires a minimal amount of gas and yet injects the solids at high pressure. If air is used as the high pressure gas, oxidation is minimized by using very short high pressure blasts of air to convey the solids into the melt at high velocity. Oxidation can be practically eliminated by using a low pressure stream of nitrogen or other non-oxidizing gas (e.g., argon or carbon dioxide) with very short high pressure blasts of air. In this combination the inert gas improves the metal by flushing included oxygen and hydrogen therefrom.

It is the object of this invention to provide an efficient method and system for injecting solid particulate materials into molten metal. It is another object of this invention to provide an improved method for refining molten iron. It is a further object to provide an improved method for desulfurizing iron with solid desulfurizing agents. Another object is to provide a method for refining molten metal in the well of a furnace. These and other objects are apparent from and are achieved in accordance with the following disclosure taken in conjunction with the attached drawings.

In accordance with the present invention, it has been discovered that molten metals can be efficiently treated with solid particulate reagents by intermittent injection of such solid reagents in granular or powdered form in a stream of gas beneath the surface of the molten metal in the well of a furnace such as a cupola furnace. The solid particulate materials are introduced on an intermittent basis with short injection periods, generally of a few seconds or less in duration, with periods between the injection periods occupying a span of time several times that of the injection periods. This method is highly effective in injecting calcium carbide and similar refining materials into molten iron to effect desulfurization of the molten iron. It can also be used for the injection of other solid reagents such as deoxidizers, degassifiers, alloying materials, fluxes and carbonaceous materials into molten metals, including lime, coke breeze, magnesia, silica, powdered coal, powdered coke, magnesium, ferrosilicon, ferrochromium, ferromanganese, silicon-chromium silicon, ferrochromium, ferromaganese, silicon-chromium alloys, silicon-magnesium-zirconium alloys, aluminum-chrominum alloys, aluminum-silicon alloys, aluminum magnesium alloys and other desirable materials such as alkali metal and alkaline earth metal oxides and carbonates. The solids so injected are dispersed efficiently throughout the molten metal in the furnace well. The reaction between the solid injected material and the molten metal proceeds rapidly and efficiently to achieve the desired results, such as desulfurization with calicum carbide or magnesium, deoxidation with deoxidizing alloys or coke, or the production of nodular iron with magnesium or other elements, as well as the formulation of high quality iron or steel alloys. The procedure can be applied to continuously or intermittently tapped furnaces so that the entire melt is efficiently treated.

The invention can perhaps be best understood by reference to the attached drawings wherein.

Figure 4:
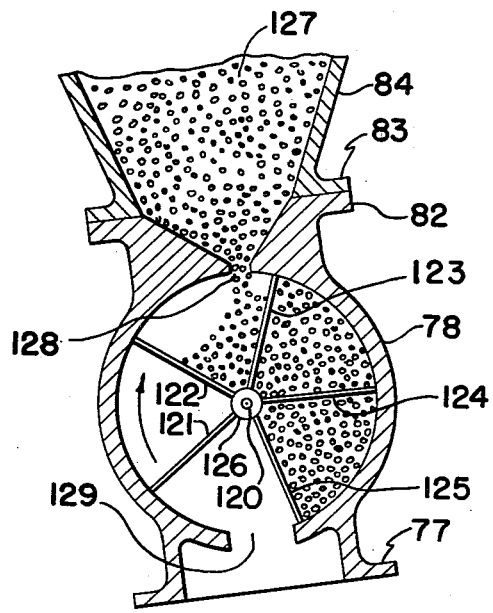
Figure 3:
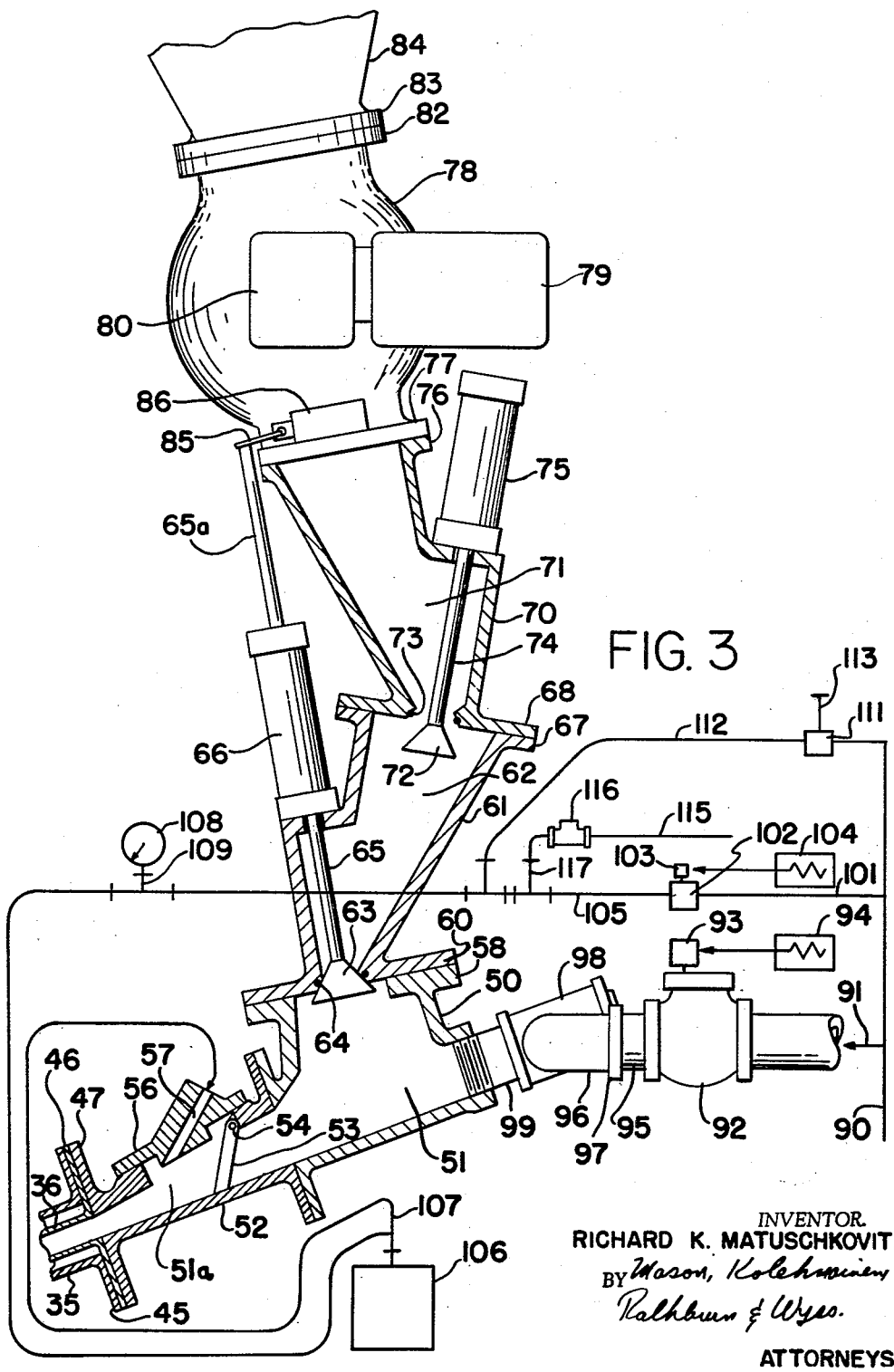
FIGURE 3 represents a cross sectional view of injection apparatus suitable for use in this invention.
Figure 5:
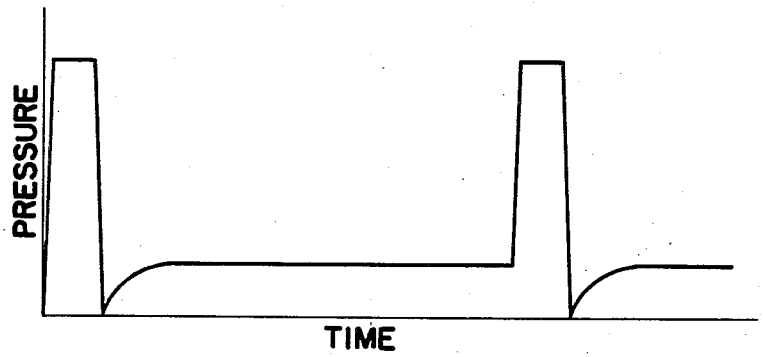
Figure 6:
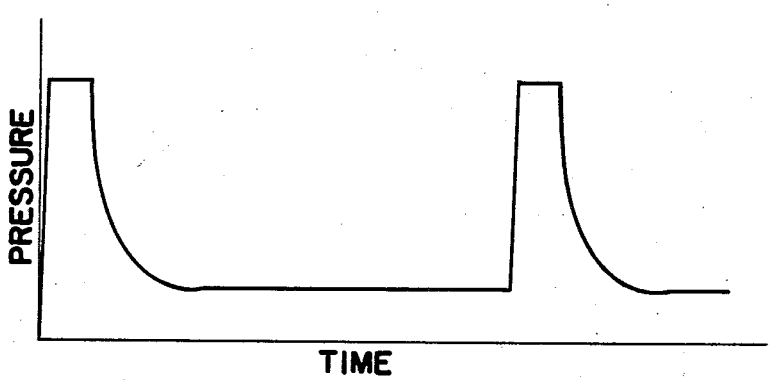

FIGURE 4 represents a cross sectional view of a feeder device for feeding and measuring solid granular materials into the injection device shown in FIGURE 3; and, FIGURES 5 and 6 are graphs illustrating the pressure changes which occur in the chamber 51a during and after blasts of high pressure are admitted through quick-opening valve 92, FIGURE 5 illustrating the violent pressure drop without a surge tank or after-blow system and FIG- URE 6 illustrating the controlled pressure drop with the surge tank or after-blow system.

Figure 1:
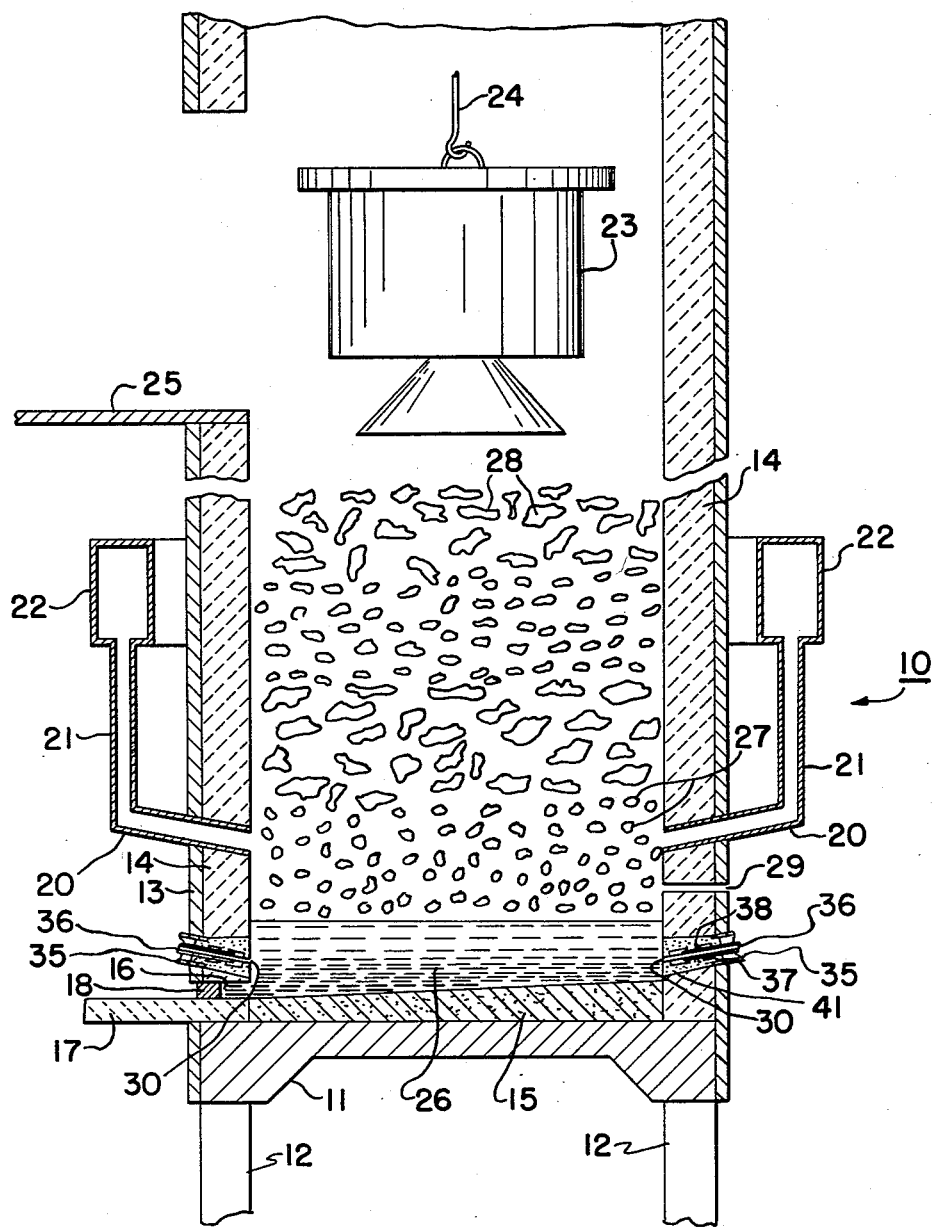
FIGURE 1 represents a cross sectional view of an intermittently tapped cupola furnace provided with injection tubes for use in the operation of this invention.

Turning to FIGURE 1, a cupola furnace generally indicated by 10 is provided with supporting base 11 on legs 12. On the supporting base 11 is an upstanding cylindrical steel shell 13 which is lined with a refractory acid or basic lining 14. On the supporting base 11 is a sand bottom 15 which is inclined slightly toward the tap hole 16 from which molten iron is withdrawn over a refractory lip 17. As illustrated in FIGURE 1, the tap hole 16 is plugged with a clay plug 18. The cupola 10 is provided with tuyeres 20 connected to piping 21 leading to the annular tuyere box or windbox 22 which surrounds the cupola. Near the top of the cupola is a bucket 23 suitably supported from a crane (not shown) by a wire rope 24. The charging bucket 23 is adapted to move into and out of the cupola by way of an opening in the cupola wall above the charging floor 25. As shown in FIGURE 1 the cupola 10 has a pool of molten iron 26 in the cupola well below the tuyeres 20. The cupola is charged with coke 27 and scrap iron 28. The heat of combustion of the coke in the air blast provided by the tuyeres 20 melts the iron scrap 28 and the molten iron descends the cupola to the molten iron pool 26. Near the bottom of the cupola above the sand bottom 15 there are one or more inlet ports 30 through part of the refractory lining 14. An outer tube 35, preferably of iron or steel, is inserted through and welded to the steel shell 13. The inner injection tube 36 is disposed within the outer tube 35, as shown in FIGURE 2.

Figure 2:
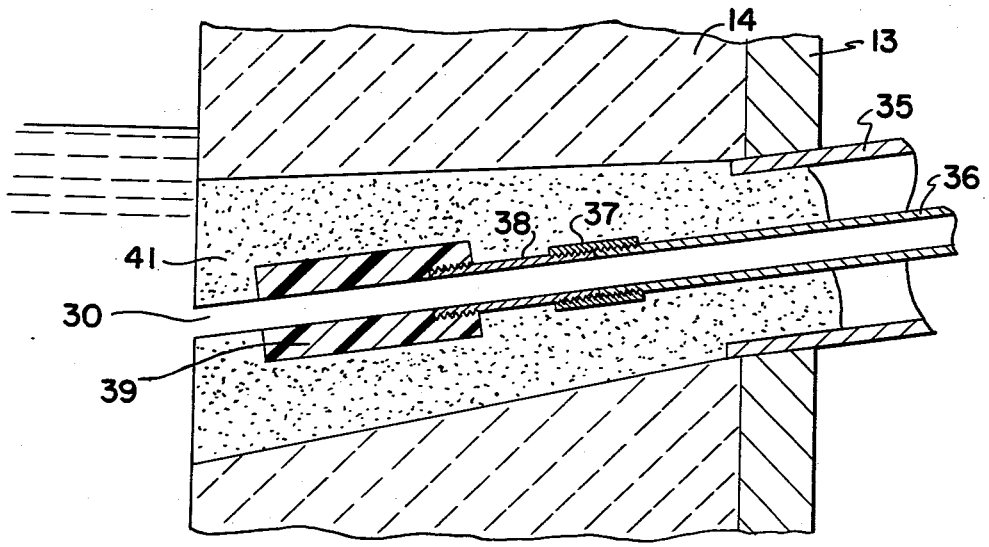
FIGURE 2 represents in cross section a suitable injection tube located in the refractory lining of a cupola furnace below the surface of the molten metal in the well thereof.

FIGURE 2 illustrates in more detail the structure of the preferred injection tube. As illustrated, the tube comprises an outer cylindrical tube 35, preferably of steel, which is welded into the steel shell 13 of the cupola. Disposed coaxially of the steel tube 35 is a smaller iron or steel tube 36, preferably of ½ inch internal diameter. The tube 36 is joined to an iron or steel bushing 37, preferably by threads. To the bushing 37 is joined an iron or steel nipple 38, also by threads. The nipple 38 is threaded to fit a graphite tube 39 (preferably of ½ inch internal diameter) which is of a length such that the inner end of the graphite tube is an inch or two inside the interior wall of the refractory lining 14. In this way the graphite tube 39 is protected from the molten metal and thereby disintegration thereof is prevented. During the lining of the cupola before operation the graphite tube 39 is preferably plugged with a cylindrical plug of approximately the same diameter as the internal diameter of the graphite tube 39. Then the lining is applied to the inside of the cupola to the thickness desired and cement 41 is inserted in tube 35 so as to surround the graphite tube 39. After this cement 41 has set, the plug is removed from the tube 39 thereby forming the cylindrical opening 30 in the cupola wall. The arrangement shown in FIGURE 2 allows ready replacement of the graphite tube 39 and nipple 38 in the event that the lining is eroded away so that the molten metal comes in contact therewith. Steel or graphite tubes could be used throughout, but the arrangement shown is more economical. For instance, the steel tube 36 could extend almost to the inner wall of the cupola and members 37, 38 and 39 could be dispensed with, but replacement costs would be increased.

As shown in FIGURE 3 the outer end of the steel tube 35 is connected to a flange 45 and the outer end of the inner tube 36 is connected to a flange 46, both of which are affixed to a flange 47 on the injection device 50–52. The injection device shown in FIGURE 3 comprises a metal housing 50 forming chambers 51 and 51a which taper toward the injection tube 36. As shown in FIGURE 3, the housing 50 can be connected to a second housing 52, although the entire housing represented by 50 and 52 could be one piece. A check valve 53 pivoted on a pin 54 separates chamber 51 from chamber 51a and when closed, prevents the passage of solid materials from the chamber 51. The unit 52 has a cover plate 56 through which an inlet tube 57 passes. The upper surface of the housing 50 is connected by a flange 58 to the bottom flange 60 of a feed retainer 61 forming a feed retaining chamber 62. At the bottom of the chamber 62 is a valve 63 which is shown in closed position against a valve seat 64. A valve stem 65 is actuated by a piston (not shown) within the cylinder 66 and operated by compressed air. The upper part of the feed retainer 61 is in the form of a flange 67 to which is affixed the lower flange of a second feed retainer 70 which forms a feed retaining chamber 71. The upper retainer 70 is also fitted with a valve 72 connected by a stem 74 to a piston (not shown) located within a cylinder 75 and operated by compressed air. The valve 72 is shown open, and when closed it seats against valve seat 73. The upper end of the feed retainer 70 is joined by a flange 76 to the lower flange 77 of a feeder mechanism 78 which is operated by a motor 79 through a gear train (not shown) located in a gear box 80. The upper end of the feeder 78 is connected by a flange 82 to the lower flange 83 of a feed hopper 84.

The upper end 65a of the valve stem 65 actuates a lever 85 on a control device 86. The control device 86 is so arranged that only when valve 63 is seated and closed, the control device allows valve 72 to be opened but not otherwise. Thus, only one valve connected to the chamber 62 can be open at one time, thus preventing blowby of gases through this chamber.

A high pressure gas stream (80–100 p.s.i.g.) is supplied to the system via a line 90 which is connected via line 91 to a quick-opening valve 92 actuated by a solenoid 93 operated by a control 94. The valve 92 is connected via a line 95 to an elbow 96 by means of a flange 97. The elbow 96 is connected to a T 98 which is connected by a nipple 99 to the housing 50 by means of threads. When the valve 92 is opened quickly, high pressure gas is admitted rapidly into chamber 51, opens the check valve 53, passes through chamber 51a and line 36 into the injection tube 39. Solid particulate material contained in chamber 51 is carried along with the stream of high pressure gas through the valve 53, chamber 51a, line 36, and injection tube 39 into the molten metal 26. The quick-opening valve 92 is open for a very short time (½ to 2 seconds) and then is quickly closed. In ordinary operations, the rapid closing of valve 92 produces a very rapid drop in pressure in chambers 51 and 51a, as well as the injection tubes 36 and 39. This rapid drop in pressure causes molten metal to enter the port 30 and the injection tube 39 and to back up in the injection system, thereby causing blockage of the system and erosion of the inlet port 30 and the injection tube 39. This undesirable phenomenon can be avoided by gradually discontinuing the flow of the stream of the high pressure gas into the stream of the low pressure gas to provide a gradual drop in pressure, preferably by means of an after-blow system described below. The after-blow system provides a supplemental source of high pressure gas to the chamber 51a, thus preventing the rapid drop in pressure which would otherwise occur in the chamber.

The high pressure gas line 90 is connected to an after-blow system comprising a high pressure gas line 101 leading to a second quick-opening valve 102 actuated by a solenoid 103 and a controller 104. From the valve 102, a line 105 is connected to a line 107 which leads to the inlet tube 57 in the cover 56 to the chamber 51a. A pressure gauge 108 is connected via a line 109 to the line 105. The after-blow system serves to provide high pressure gas to the chamber 51a just before the quick-opening valve 92 closes, thus compensating for the pressure drop which would otherwise occur when the high pressure gas is cut off at the valve 92. The after-blow system operates by the controller 104 actuating the solenoid 103 to open the valve 102 just before the valve 92 is closed. The valve 102 remains open only a very short period of time (½–2 seconds) sufficient to maintain pressure in chamber 51a, then is closed before the valve 63 into the chamber 51 is opened. After valve 92 is closed, the valve 102 is quickly closed so that it is open for only 2 or 3 seconds.

The after-blow system also includes the surge tank 106 connected by the line 107 to the inlet tube 57 leading into the chamber 51a. When the high pressure gas stream from the valve 92 is admitted to the chamber 51a through the valve 53, part of it passes through the line 107 into the surge tank 106, thereby raising the pressure in the surge tank to approximately that in the line 90. When the valve 92 is rapidly closed, the high pressure gas stored in the surge tank 106 returns via the line 107 to the chamber 51a and the line 36, thus further dampening the rapid reduction of pressure in chambers 51 and 51a and preventing molten metal from being drawn into the port 30 and the injection tube 39.

FIGURES 5 and 6 are a pair of graphs representing the pressure changes in chamber 51a plotted against time. FIGURE 5 illustrates the rapid and marked pressure changes that occur without the dampening effects of the surge tank 106 and/or the high pressure gas stream in line 101 in combination with the quick-opening valve 102. When the valve 92 closes rapidly, the pressure in chamber 51a drops below that of the continuous low pressure gas stream from line 117, thus creating a reverse flow in lines 36 and 38 and tube 39 which draws molten metal into the port 30 and tube 39. FIGURE 6 illustrates the dampening effect of the surge tank 106 and/or high pressure gas stream admitted to the line 107 by way of the quick-opening valve 102 from the line 101. It is seen that the pressure in the chamber 51a falls only slightly below that of the continuous low pressure gas stream from line 117 and there is no tendency to create a vacuum or low pressure in that chamber and connecting lines 36 and 38 or injection tube 39.

The line 90 also leads to a quick-opening valve 111 connected to a line 112 which is joined to the line 105. The valve 111 can be manually controlled by a handle 113 or may be actuated by a solenoid control if desired. A low pressure (15–40 p.s.i.g.) gas line 115 is connected via a check valve 116 and a line 117 to the line 105 and provides a steady flow of low pressure gas throughout the system.

FIGURE 4 represents in cross section the feeding mechanism 78. A central horizontal shaft 120 has attached thereto vanes 121, 122, 123, 124 and 125 connected by means of a hub 126. The shaft 120 rotates in a clockwise fashion and allows the granular solid material 127 contained in the hopper 84 to move downward through a throat 128 and into the sectors between the vanes (for example vanes 122 and 123). As the vanes move in a clockwise fashion, the granular material contained between them is dumped through a second throat 129, out of the bottom of the feeder 78 and into the chamber 71. By controlling the speed of rotation of the shaft 120 the amount of granular material fed into the chamber 71 in a given period of time can be controlled.

In the operation of this invention solid granular material in the hopper 84 passes via the feeder 78 at a controlled rate into the upper chamber 71 while the valve 72 is closed. By a timing system (not shown) valve 72 is opened when valve 63 is closed and the granular material in chamber 71 flows downward into the chamber 62. The timing mechanism then closes the valve 72 and allows the valve 63 to open, thereby allowing the granular material to descend into the chamber 51 where it is retained by means of the closed check valve 53. The latter remains closed because of the constant pressure gas stream entering the system via a line 115. After the granular material has dropped into the chamber 51 the valve 63 is closed by the timing mechanism. The upward motion of the valve stem 65a activates the lever 85 and closes a switch in the controller 86, thereby allowing the timing mechanism to open valve 72 and repeat the cycle.

While the valve 63 is closed, the quick-opening valve 92 is opened and a blast of high pressure gas from the line 90 is injected into the chamber 51 via line 95, elbow 96, T 98 and nipple 99. The high pressure gas stream forces open the check valve 53 which is suspended on the pivot 54 and blasts the granular material in chamber 51 through the tube 36, bushing 37, nipple 38, graphite tube 39 and the port 30, into the molten metal below the surface thereof in the cupola. The quick-opening valve 92 is opened for only a relatively short period of time (from a fraction of a second to perhaps one to three seconds). The interval between the blasts of high pressure gas through the valve 92 can be in the range of 5 to 100 seconds, during which time solid granular material from the feeder 78 is passed through the chambers 71 and 62 into the chamber 51 for re-injection.

The continuous low pressure gas flow through line 115, valve 116, line 117 and line 105 keeps the check valve 53 closed at all times except when the high pressure blast of gas is introduced via valve 92. This low pressure gas stream passes through the line 36 and the graphite tube 39 into the molten metal continuously, thereby maintaining the port 30 clear and unobstructed with solid granular material, molten metal or slag. In the event that there is an obstruction in the opening 30 or the graphite tube 39, the pressure gauge 108 will indicate a rise in pressure corresponding to the obstruction and thus warn the operator thereof. If obstructions form in the opening 30 or the graphite tube 39, they can be removed by means of the manually operated quick-opening valve 111. By opening this valve for a short period of time a high pressure jet of gas from the line 90 passes through the valve 111 and the line 112 into the lines 105 and 107, thereby passing into the injection system via the opening 57 into the chamber 51a from which it passes into the line 36 to clear the injection system. The solenoid control valve 102 can also serve this purpose as part of the timing mechanism.

In operation a conventional timing mechanism (not shown) is so arranged that the valve 92 is open only when the valve 63 is closed so that the blast of high pressure gas passes out of the system via the line 36. While the valve 63 is closed the valve 72 is opened and allows granular material to drop into the chamber 62. After the valve 92 has been closed, the valve 63 is opened and allows granular material to fall into the chamber 51 and the cycle is then repeated by quickly opening the valve 92 and blasting the granular material out of the chamber 51 through the tube 36 into the molten metal beneath the surface thereof. While the blast is operating through valve 92, valve 72 is opened allowing further granular material to drop into the chamber 62 for a repetition of the process. The sequence of operations is as follows: Granular material is fed into chamber 71 by the feeder 78 which operates at controlled speed so as to measure out the calculated amount of solid material in a given period of time; upper valve 72 is opened to allow the solid material to drop into chamber 62; valve 72 is closed; lower valve 63 is opened to allow the material to drop into chamber 51; valve 63 is closed; valve 92 is opened rapidly to allow a blast of high pressure gas into chamber 51, thereby forcing open valve 53 and forcing the solid material at high speed through the tubes 36, 37, 38 and 39 into the molten metal by way of the port 30; after-blow valve 102 is opened; valve 92 is closed; valve 102 closes; the constant gas stream entering by lines 115, 105 and 107 forces valve 53 closed and maintains pressure in tubes 36 and 39, thereby purging molten metal therefrom. After a suitable intermission of 5 to 100 seconds, the cycle is repeated. The entire cycle occupies 5 to 15 seconds ordinarily. The intermission is determined by the amount of material to be injected in a given melt period.

The gas which is used in this system can be any of the readily available gases. Air is satisfactory in both the line 90 and the line 115. In some instances, it may be desirable to use nitrogen or other inert gas in line 115, although for economical purposes this air is preferred throughout. Oxygen can serve as the gas in situations where oxygen injection for oxidation of impurities in the molten metal is desired. The pressure in the continuous gas line 115 is in the range of 15–40 lbs. per square inch (gauge) and is regulated in relation to the static head within the cupola above the inlet port 30. The static head can, in intermittently tapped cupolas, be as much as 12 to 15 inches although ordinarily it is in the range of 4 to 6 inches. The valve arrangement 63 and 72 prevents the blowby of high pressure gas from the chamber 51 into the chambers 62 or 71 so that all gas must leave the chamber 51 via the line 36 which leads into the molten metal pool.

The size of the particulate material which can be injected into the molten metal in accordance with this invention can vary from fine powder to granules up to ¼ inch in diameter. For instance, ferrosilicon up to rice size can be efficiently injected. The pipes and tubes through which the granular material is passed can be of any internal diameter larger than the size of the granular material. As a practical matter, pipes and tubes of internal diameter not greater than ½ inch are preferred. Uniform diameter of the injection system is desirable in order to avoid pockets and depressions in which solid materials can collect.

By means of the present invention the injection of solid materials into the molten metal occurs beneath the surface thereof so that there is a complete and efficient contact between the molten metal and the injected material. This complete contact provides for effective reaction and therefore desulfurization, deoxidation and alloy-formation are much more efficiently conducted than by procedures whereby such materials are added above the surface of the molten pool. Furthermore, contact or contamination with slag which floats on top of the molten metal is avoided.

The amount of solid material injected into the molten metal depends upon the nature of the metal, the product to be obtained and the type of solid material injected. For instance, in the refining of grey iron 2 to 10 lbs. of calcium carbide may be injected per ton of iron, usually in three or four blasts of about one second duration per ton. Iron can also be desulfurized with magnesium pellets for the production of nodular iron in amounts of 1–2 lbs. per ton, depending on sulfur content of the melt. Mixtures of granular calcium carbide and magnesium pellets can be injected to reduce the violence of the reaction with magnesium.

The invention is further disclosed by means of the following examples which are illustrative of the invention. It will be evident that other molten metals and other solid materials can be used within the scope of this invention.

*Example 1*

A No. 6 acid lined intermittently tapped cupola furnace (48-inch inside diameter) was charged with successive charges consisting of 800 lbs. of steel scrap, 150 lbs. of silvery pig iron, 550 lbs. of remelt, 150 lbs. of coke and 15 lbs. of limestone. Prior to charging, the coke bed had been ignited in the normal way and the coke bed burned in. Normal cupola practice was followed thereafter.

The cupola was equipped with one graphite inlet tube (as shown in FIGURE 2) of ½-inch internal diameter. Eutectic calcium carbide (a mixture of 14 mesh and rice size) was injected at the rate of 2 lbs. per minute. Iron (approximately 1500 lbs.) was tapped every 8 minutes. Thus the total calcium carbide injected per ton of iron was 16 lbs.

A continuous air stream at 15–25 p.s.i.g. (275–500 cu. ft./hr.) was maintained through the graphite tube and calcium carbide was injected with blasts of air at 90–100 p.s.i.g. The injection period was approximately one second (10–12 cu. ft. of air) with about 8 seconds between injections. The sulfur content of the iron as tapped without calcium carbide injection was 0.135%. After calcium carbide injection the sulfur content was 0.066%. One pound of sulfur was removed with approximately 8 lbs. of calcium carbide, demonstrating the high efficiency of the operation.

*Example 2*

A 1700 lb. charge of scrap steel, pig iron and remelt was melted in a No. 6 acid-lined cupola equipped with an injection tube as described in Example 1. The melt was injected with 4 lbs. of ferrosilicon (75% silicon) in 4 blasts of about one second duration each. A continuous air stream at 15–20 p.s.i.g. (325–350 cu. ft./hr.) was maintained and the ferrosilicon was injected with air blasts (12–14 cu. ft.) at 80–90 p.s.i.g., with about 12 seconds between blasts.

The iron so treated had improved structure as compared to untreated iron and the chill depth was reduced to the desired ⅜ inch from ¾ inch.

I claim:

1. Method of treating molten metal which comprises intermittently injecting solid particulate material into said molten metal below the surface thereof in the well of a furnace, the injection being conducted in a continuous gas stream of sufficient pressure to overcome the static pressure of the molten metal and the solid particulate material being blasted into said continuous gas stream with a second intermittent gas stream of higher pressure, thereby causing said particulate material to pass at high speed in said combined gas stream into said molten metal.

2. Method of intermittently injecting solid particulate material into molten metal which comprises maintaining a body of molten metal in a vessel provided with an injection tube with an outlet below the metal surface in the well of a furnace, flowing a continuous stream of gas through said tube and into said molten metal at a pressure sufficient to overcome the pressure of the molten metal, passing said solid particulate material into said gas stream with a short blast of high pressure gas and conducting said solid particulate material by means of the combined gas stream into the molten metal below the surface thereof.

3. Method of claim 2 wherein the metal is iron and the solid particulate material is finely divided calcium carbide.

4. Method of claim 2 wherein the metal is iron and the solid particulate material is magnesium pellets.

5. Method of claim 3 wherein the continuous gas stream is nitrogen and the high pressure gas is air at a gauge pressure approximately five times the gauge pressure of the continuous gas stream.

6. Method of claim 5 wherein the high pressure gas is applied in blasts of one-half to three seconds in duration with periods of five to fifty seconds between injections.

7. Method of treating molten metal with solid particulate material which comprises flowing a continuous gas stream into said molten metal through an injection tube having an outlet below the surface of the molten metal in the well of a cupola, said continuous gas stream having a pressure sufficient to overcome the static head of the molten metal, injecting solid particulate material concurrently into said continuous gas stream with a short intermittent blast of high pressure gas, conducting said solid particulate material by means of the combined gas stream formed from said continuous gas stream and said intermittent blasts of high pressure gas through the injection tube into the molten metal, flowing a stream of high pressure gas concurrently into the stream of low pressure gas before the short intermittent blast of high pressure gas is discontinued, and thereafter discontinuing the flow of the stream of high pressure gas into the stream of low pressure gas.

8. Method of treating metal in a furnace which comprises melting metal in a furnace, flowing a continuous gas stream into said molten metal through an injection tube extending through a wall of said furnace and having an outlet below the surface of the molten metal, said continuous gas stream having a pressure sufficient to overcome the static head of the molten metal, injecting solid particulate material concurrently into said continuous gas stream with a short intermittent blast of high pressure gas, conducting said solid particulate material by means of the combined gas stream formed from said continuous gas stream and said intermittent blasts of high pressure gas through the injection tube into the molten metal, thereafter gradually discontinuing the flow of the stream of high pressure gas ino the stream of low pressure gas to prevent a too rapid drop in pressure, thereby ensuring that molten metal will not enter the injection tube.

9. Method of treating metal in a furnace which comprises melting metal in a furnace, flushing the molten metal by flowing a continuous inert gas stream into said molten metal through an injection tube extending through a wall of said furnace and having an outlet below the surface of the molten metal, said continuous inert gas stream having a low pressure sufficient to overcome the static head of the molten metal, injecting solid particulate material concurrently into said continuous gas stream with a short intermittent blast of high pressure gas, conducting said solid particulate material by means of the combined gas stream formed from said continuous inert gas stream and said intermittent blasts of high pressure gas through the injection tube into the molten metal, thereafter gradually discontinuing the flow of the stream of high pressure gas into the stream of low pressure gas.

No references cited.